(12) United States Patent
Mitamura et al.

(10) Patent No.: US 6,682,687 B1
(45) Date of Patent: Jan. 27, 2004

(54) METHOD FOR MANUFACTURING A TIRE

(75) Inventors: Hisashi Mitamura, Takasago (JP);
Yasuhiko Fujieda, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 337 days.

(21) Appl. No.: 09/669,735

(22) Filed: Sep. 26, 2000

(30) Foreign Application Priority Data

Sep. 29, 1999  (JP) ............................................ 11-275466

(51) Int. Cl.[7] .............................................. B29C 35/00
(52) U.S. Cl. ........................ 264/486; 264/315; 264/326
(58) Field of Search ................................ 264/315, 326, 264/486; 425/31, 32, 35, 41, 174.8 R

(56) References Cited

U.S. PATENT DOCUMENTS

| | | | |
|---|---|---|---|
| 3,144,374 A | * | 8/1964 | Saint Paul |
| 3,824,048 A | | 7/1974 | Getz |
| 3,837,770 A | * | 9/1974 | Gazuit .......................... 425/33 |
| 3,909,337 A | * | 9/1975 | Yabe |
| 5,062,781 A | * | 11/1991 | Szyms et al. .................. 425/52 |
| 5,853,526 A | * | 12/1998 | Laurent et al. ............. 156/396 |

FOREIGN PATENT DOCUMENTS

| | | |
|---|---|---|
| EP | 0 199 064 | 10/1986 |
| JP | 3-274110 | * 12/1991 |

* cited by examiner

*Primary Examiner*—Mathieu D. Vargot
(74) *Attorney, Agent, or Firm*—Oblon, Spivak, McClelland, Maier & Neustadt, P.C.

(57) ABSTRACT

When a green tire is molded on a bladder in molding step and then carried into the mold of a vulcanizer in vulcanization step to vulcanization-mold the green tire, the upper bead and lower bead of the green tire are connected and fixed through a center post as they are retained by the bladder kept in the airtight state by an upper ring and a lower ring until the molded green tire has been carried into the mold of the vulcanizer, and a pressure gas is sealed into the bladder located in the internal space of the green tire to lay it in the expanded state, whereby the green tire can be carried between the steps and carried into the mold in the state maintaining a fixed shape. Accordingly, the deformation of the green tire can be prevented, and the slippage of supporting center of the green tire when set in the vulcanizer can be sufficiently reduced.

14 Claims, 8 Drawing Sheets

METHOD FOR MANUFACTURING A TIRE

BACKGROUND OF THE INVENTION

1. Field of the Invention

This invention relates to a method for manufacturing a tire for vulcanization-molding a green tire.

2. Description of the Related Art

In the manufacture of a tire, a carcass assembly that is a basic component of tire is assembled and molded on an inflated drum in a molding machine of molding step, the tire assembly is taken out from the drum, lateral beads thereof are grasped by a rim, and air is then sealed into the tire to inflate it. Thereafter, a belt member and a tread member are stuck onto the outer surface of the carcass assembly, whereby a green tire is molded.

The green tire is then grasped by the chucking mechanism of a carrying device, carried out from the molding step, and carried to vulcanization step after carried to and temporarily stored in a storehouse on the basis of a production plan, or directly carried from the molding step to the vulcanization step. In the vulcanization step, the green tire placed in a prescribed carrying-in position is grasped by the chucking loader of a vulcanizer, carried to between opened molds, and set so that a bladder is located within the tire hole. Thereafter, the molds are clamped, and a high-temperature, high-pressure gas is supplied into the bladder, whereby the bladder is extended and closely fitted to the tire inner wall surface. The tire inner wall surface is pressed in the mold direction with heating through the bladder, whereby the tire grooves of the molds are formed on the tread of the green tire, and the resulting green tire is vulcanized by heating from the outside and inside by the heated molds and the bladder exposed to the high-temperature pressure gas.

However, in the above-mentioned conventional method, even if the green tire is precisely formed in the molding machine, the rubber-made green tire is apt to deform in the course of carrying since it is grasped by the chucking mechanism to take and place it in the carrying-in position of the storehouse or vulcanization step, and then re-grasped again to carry it into the vulcanizer. Therefore, when the green tire is carried into the vulcanizer, the supporting center of the green tire is significantly slipped, which brings about the problem that the precision of vulcanization molding is apt to deteriorate.

SUMMARY OF THE INVENTION

It is therefore an object of this invention to provide a method for manufacturing a tire capable of significantly reducing the slippage of supporting center of the green tire in the carrying to the vulcanizer.

The method of this invention comprises molding a green tire in molding step and carrying it into the mold of a vulcanizer in vulcanization step to vulcanization-mold the green tire, in which the upper bead and lower bead of the green tire are connected and fixed as they are kept in the airtight state until the molded green tire has been carried into the mold of the vulcanizer, and a pressure gas is sealed to the internal space of the green tire to lay it in the expanded state. According to the above constitution, since the green tire is carried between the respective steps and carried into the mold in the state maintaining a fixed shape, the deformation in carrying of the green tire can be prevented. Thus, when the green tire is set in the vulcanizer, the slippage of supporting center of the green tire can be sufficiently reduced.

The method of this invention comprises molding a green tire on a bladder in molding step and carrying it into the mold of a vulcanizer in vulcanization step to vulcanization-mold the green tire, in which the upper bead and lower bead of the green tire are connected and fixed as they are kept in the airtight state until the molded green tire has been carried into the mold of the vulcanizer, and a pressure gas is sealed to the bladder located in the internal space of the green tire to lay it in the expanded state. According to the above constitution, since the green tire is carried between the respective steps and carried into the mold in the state maintaining a fixed shape, the deformation of the green tire can be prevented. Thus, when the green tire is set in the vulcanizer, the slippage of supporting center of the green tire can be sufficiently reduced.

In the above-described method, the bladder has a low drawable material difficult to deteriorate under high-temperature environment as the component, and it is formed into the shape of the tire inner wall surface in the vulcanized tire obtained by vulcanization molding the green tire. According to this constitution, the green tire can be precisely formed and also vulcanization-molded. The bladder may have a plurality of magnetic members on the surface. According to this, since the magnetic members can be directly heated by use of an induction heating coil, the temperature can be raised to the vulcanization temperature in a short time.

The above-mentioned method is further characterized by performing the vulcanization molding in the vulcanizer while maintaining the connection and fixation between the upper bead and lower bead of the green tire. Since the connection and fixation between the upper bead and lower bead is maintained when the high-temperature, high-pressure pressure gas is supplied to the internal space of the green tire to press the tire inner wall surface in the mold direction, the opening of the mold can be surely prevented even if the clamping force to the mold is small. According to this, the frame structure of the vulcanizer for imparting the clamping force to the mold can be set to a specification corresponding to a small clamping force, and the vulcanizer can be consequently miniaturized to reduce the cost.

The method of this invention comprises arranging a retaining mechanism in a tire molding machine in molding step; molding a green tire around the retaining mechanism; connecting and fixing the upper bead and lower bead of the green tire while keeping them in the airtight state; sealing a pressure gas to the internal space of the green tire to expand it prior to the taking-out from the molding step; carrying the green tire to vulcanization step in this state; and vulcanization-molding the green tire within the mold of a vulcanizer in the vulcanization step. Further, this method comprises arranging a retaining mechanism and a bladder in a tire molding machine in molding step; molding a green tire on the bladder; keeping the bladder in the airtight state; sealing a pressure gas to the bladder located in the internal space of the green tire to expand it prior to the taking-out of the green tire from the molding step; carrying the green tire to vulcanization step in this state; and vulcanization-molding the green tire within the mold of a vulcanizer in the vulcanization step. According to this, since the green tire is carried between the respective steps and carried into the mold in the state maintaining a fixed shape, the deformation in carrying of the green tire can be prevented. Thus, when the green tire is set in the vulcanizer, the slippage of supporting center of the green tire can be sufficiently reduced.

In the above method, the bladder has a low drawable material difficult to deteriorate under high-temperature environment as the component, and it is formed into the shape of the tire inner wall surface in the vulcanized tire obtained by vulcanization molding the green tire. The bladder may have a plurality of magnetic members on the surface. Further, the retaining mechanism may have an induction heating coil, so that the vulcanization molding is performed with addition of a high frequency power in the vulcanization molding by the vulcanizer. Since the magnetic members can be directly heated by use of the induction heating coil, the temperature can be raised to the vulcanization temperature in a short time.

In the above method, the retaining mechanism may be provided with an upper bladder ring and a lower bladder ring to seal the pressure gas after the upper edge and lower edge of the bladder are held by both the rings. In the method according to claim 8, the green tire may be carried into storage step prior to the carrying into the vulcanization step, preheated during the storage, and then carried to the vulcanization step.

DESCRIPTION OF THE PREFERRED EMBODIMENTS

Figure 1:
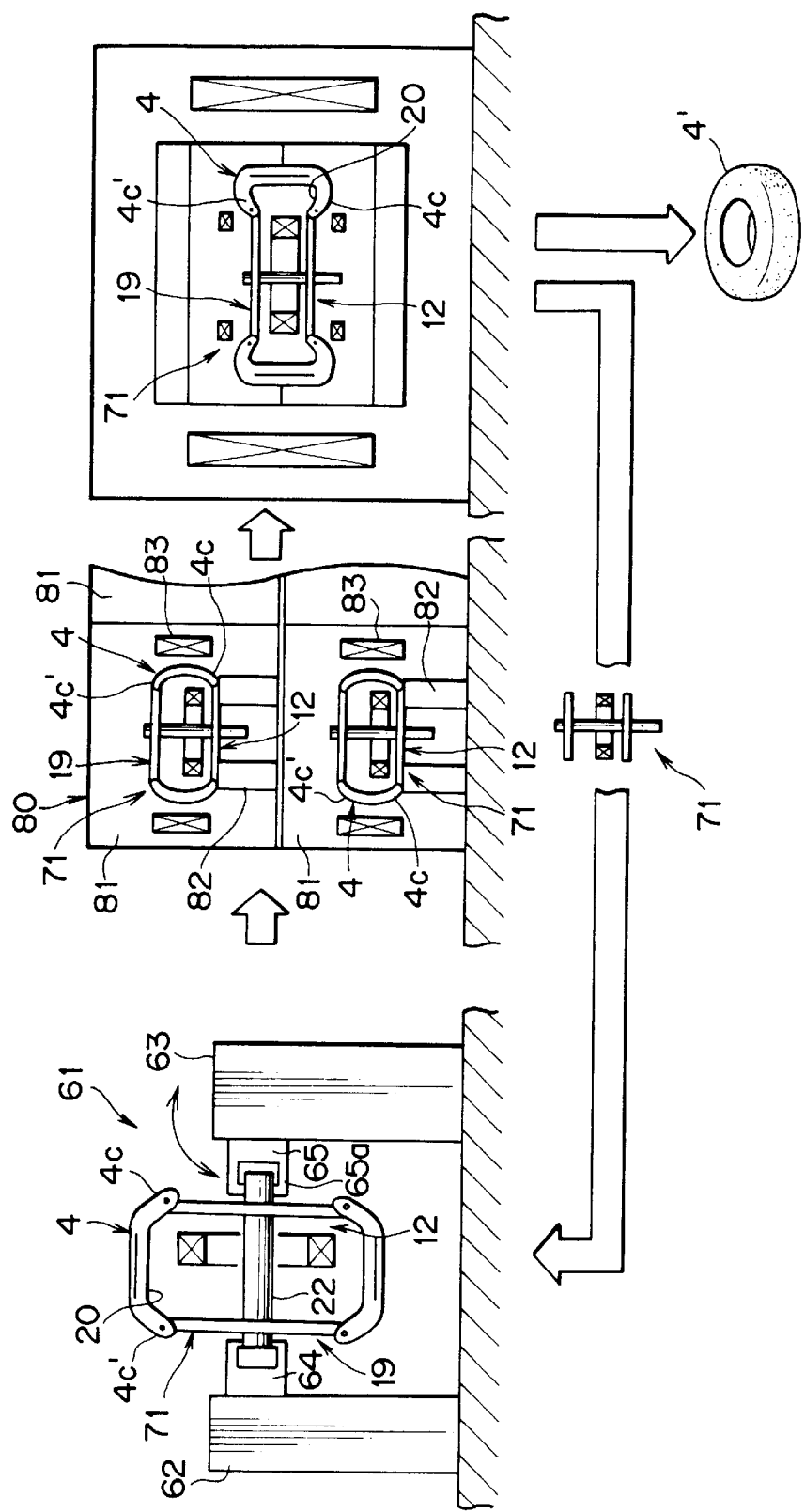
FIG. 1 is an illustrating view showing a series of steps in the manufacture of a tire.

One embodiment of this invention is further described on the basis of FIG. 1 to FIG. 8. The method for manufacturing a tire according to this embodiment is applicable to a production system having at least a molding step of molding a green tire 4 and a vulcanization step of vulcanization-molding the green tire 4 as shown in FIG. 1, and further having a storage step of temporarily storing the green tire 4 prior to vulcanization molding according to a production plan.

Figure 3:
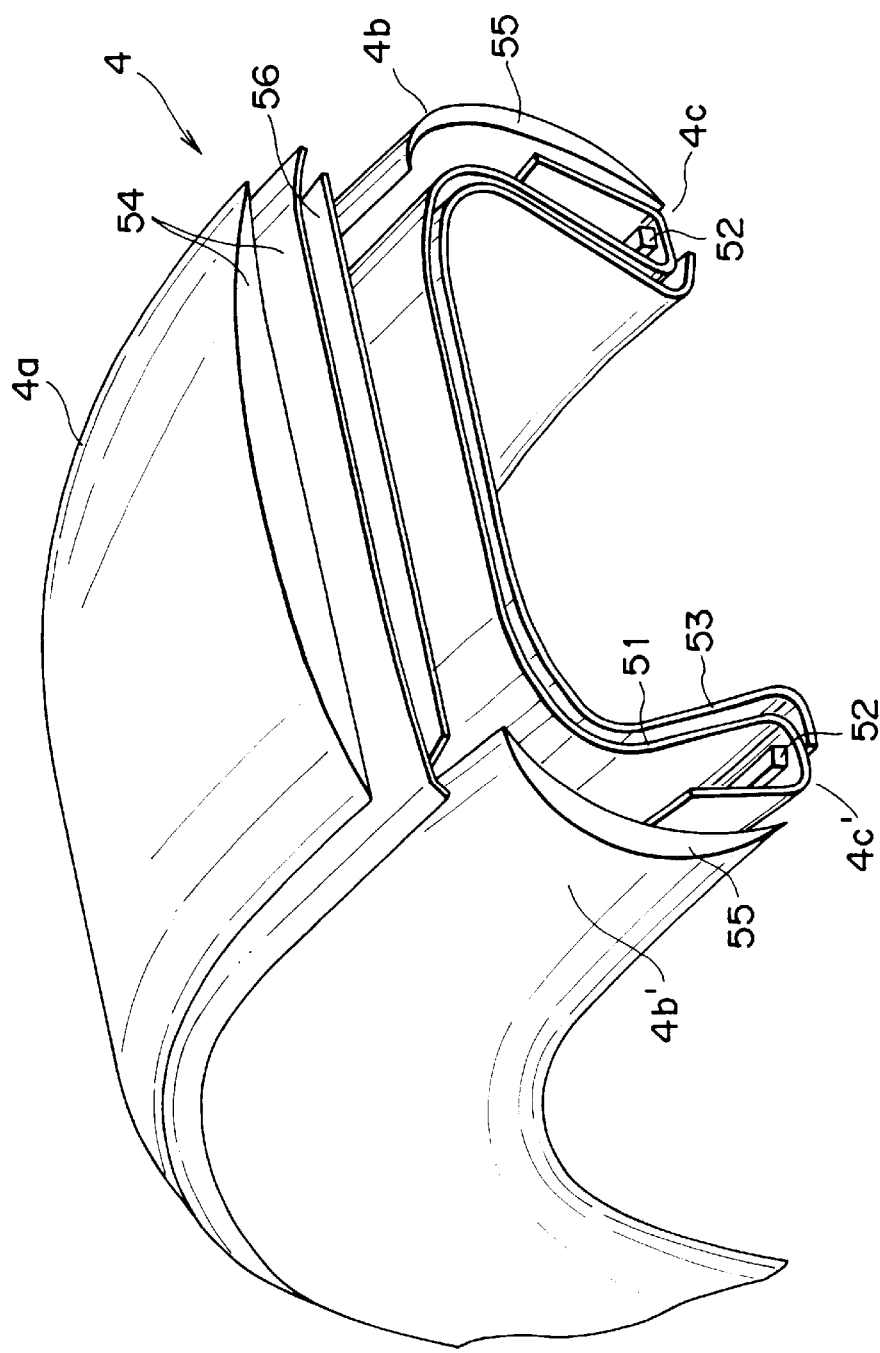
FIG. 3 is an exploded perspective view showing the essential part of the green tire.
Figure 5:
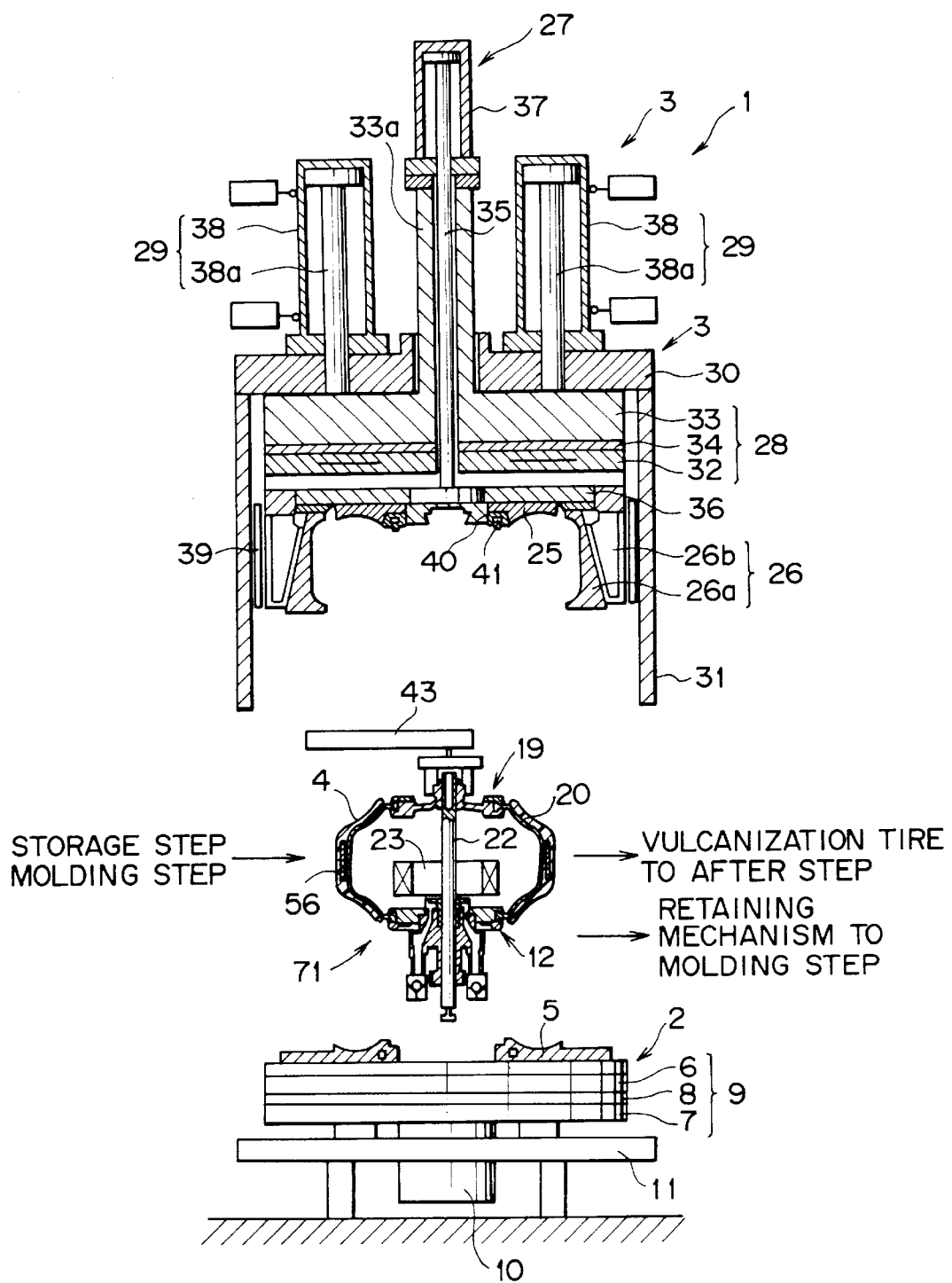
FIG. 5 is an illustrating view showing the state of carrying the green tire to a vulcanizer in vulcanization step.

The vulcanization step includes a vulcanizer 1 for vulcanization-molding the green tire 4. The vulcanizer 1 comprises a mold fixed part 2 set in a prescribed height position and a mold elevating part 3 rising and falling relative to the mold fixed part 2 as shown in FIG. 5. The green tire 4 comprises, as shown in FIG. 3, a carcass assembly 51 bent at both ends, metallic bead wires 52 provided in the bent parts of the carcass assembly 51, a rubber inner liner 53 stuck onto the inside surface of the carcass assembly 51, rubber tread members 54 and sidewall members 55 stuck to the outside surface and side circumferential surfaces of the carcass assembly 51, respectively, and a metallic belt member 56 provided on the carcass assembly 51 between the sidewall member 55, whereby metallic members (the bead wires 52, the belt member 56) are provided within the tire inner part surrounded by thick tread 4a and beads 4c, 4c'.

The mold elevating part 3 comprises, as shown in FIG. 5, an upper side mold 25 to make contact with the upper sidewall 4b' of the green tire 4, a split mold 26 situated in the circumferential direction of the tread 4a of the green tire 4, a first mold elevating mechanism 27 for raising and lowering the upper side mold 25 and the slide segment 26a of the split mold 26, an upper heating mechanism 28 for heating the upper side mold 25 to a prescribed temperature, a second mold elevating mechanism 29 for raising and lowering the upper heating mechanism 28 and the fixed ring 26b of the split mold 26, and a support member 30 for supporting the mechanisms 27–29.

The upper heating mechanism 28 comprises a disc-like upper platen 32. The upper platen 32 has an internal space to which high-temperature vapor is supplied, and it is heated by the vapor supplied to the internal space to heat the upper side mold 25 in planer form. The upper heating mechanism 28 further comprises a platen support 33 for supporting the upper platen 32 and a heat insulating plate 32 interposed between the upper platen 32 and the platen support 33 so as to prevent the heat transfer from the upper platen 32 to the platen support 33.

Figure 8:
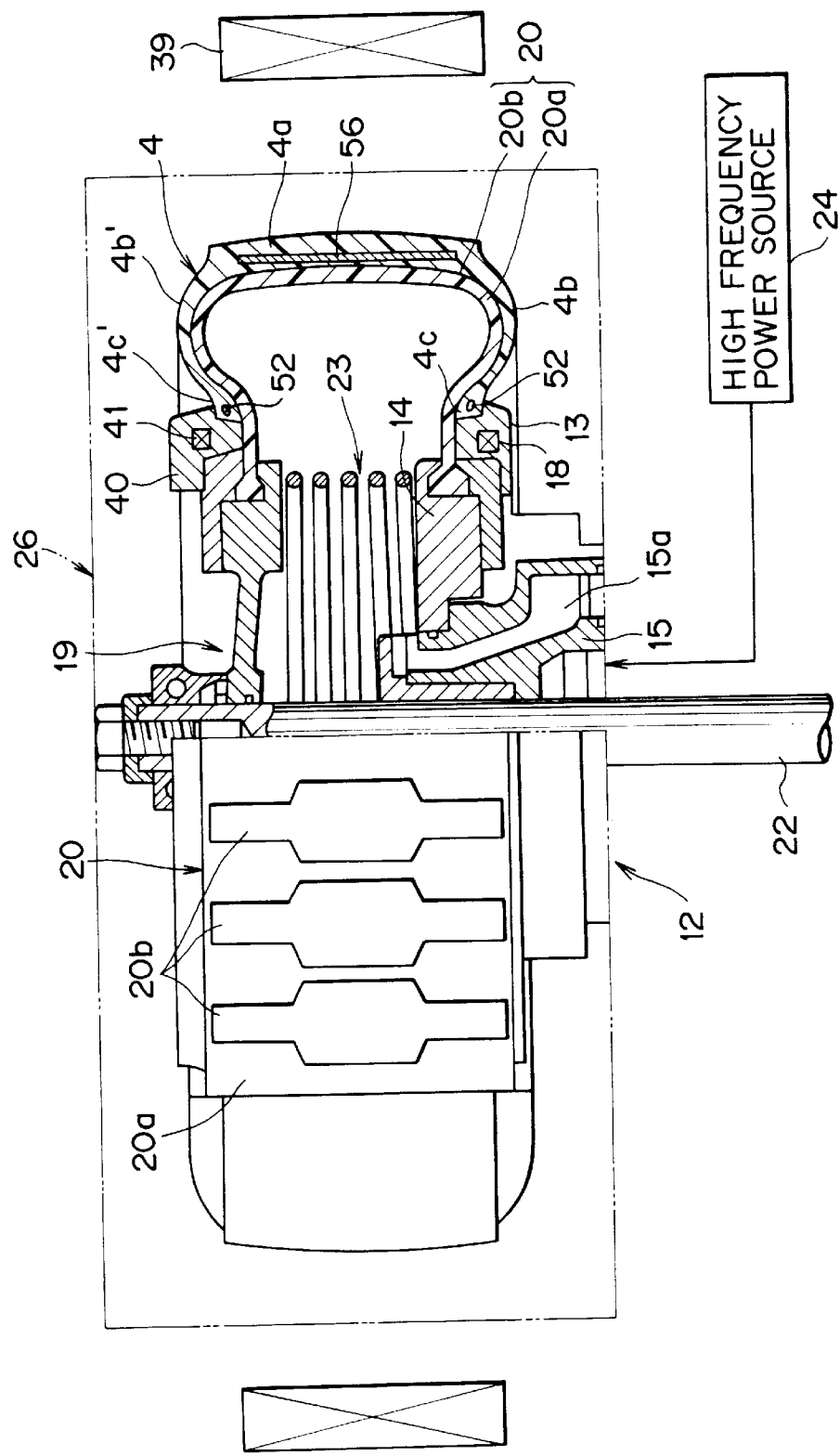
FIG. 8 is an illustrating view showing the state of vulcanization molding.

The bar member 35 of the first mold elevating mechanism 27 is inserted through the center of the upper heating mechanism 28 in such a manner as to be movable upward and downward. A disc-like slide plate 36 is provided on the lower end of the bar member 35. The upper side mold 25 is fixed on the side closer to the center in the lower surface center of the slide plate 36. An upper bead ring 40 formed so as to make contact with the upper bead 4c' of the green tire 4 is provided on the inside part of the upper side mold 25. An annular third induction heating coil 41 is provided within the upper bead ring 40. A high frequency power source 24 of FIG. 8 is connected to the third induction heating coil 41, and the third induction heating coil 41 preferentially induction-heats the bead wire 52 of the upper bead 4c' by applying a strong high frequency magnetic field by the supply of high frequency power to the upper bead 4c' of the green tire 4.

A plurality of slide segments 26a formed of a nonmagnetic material such as aluminum is formed on the lower surface periphery of the slide plate 36. Each slide segment 26a is arranged at equal intervals on a concentric circle about the upper side mold 25, and engaged in such a manner as to be movable in the central direction. A fixed ring 26b formed of a nonmagnetic material is arranged on the outside of the slide segments 26a, and the fixed ring 26b is fixed to the lower surface edge of the upper platen 32 so as to radially protrude and recess the slide segments 26a while engaging with the outside surfaces of the slide segments 26a. The slide segments 26a form a cylindrical mold according to the tread 4a of the green tire 4 when they are moved toward the center by the fixed ring 26b.

The mold fixed part 2 is arranged under the thus-constituted mold elevating part 3. The mold fixed part 2 comprises a lower side mold 5 to make contact with the lower sidewall 4b of the green tire 4, a lower heating mechanism 9 for heating the lower side mold 5 to a prescribed temperature, a central mechanism 10 provided in the center part of the lower heating mechanism 9 and the lower side mold 5, and a base frame 11 for supporting the central mechanism 10 and the lower heating mechanism 9.

Figure 6:
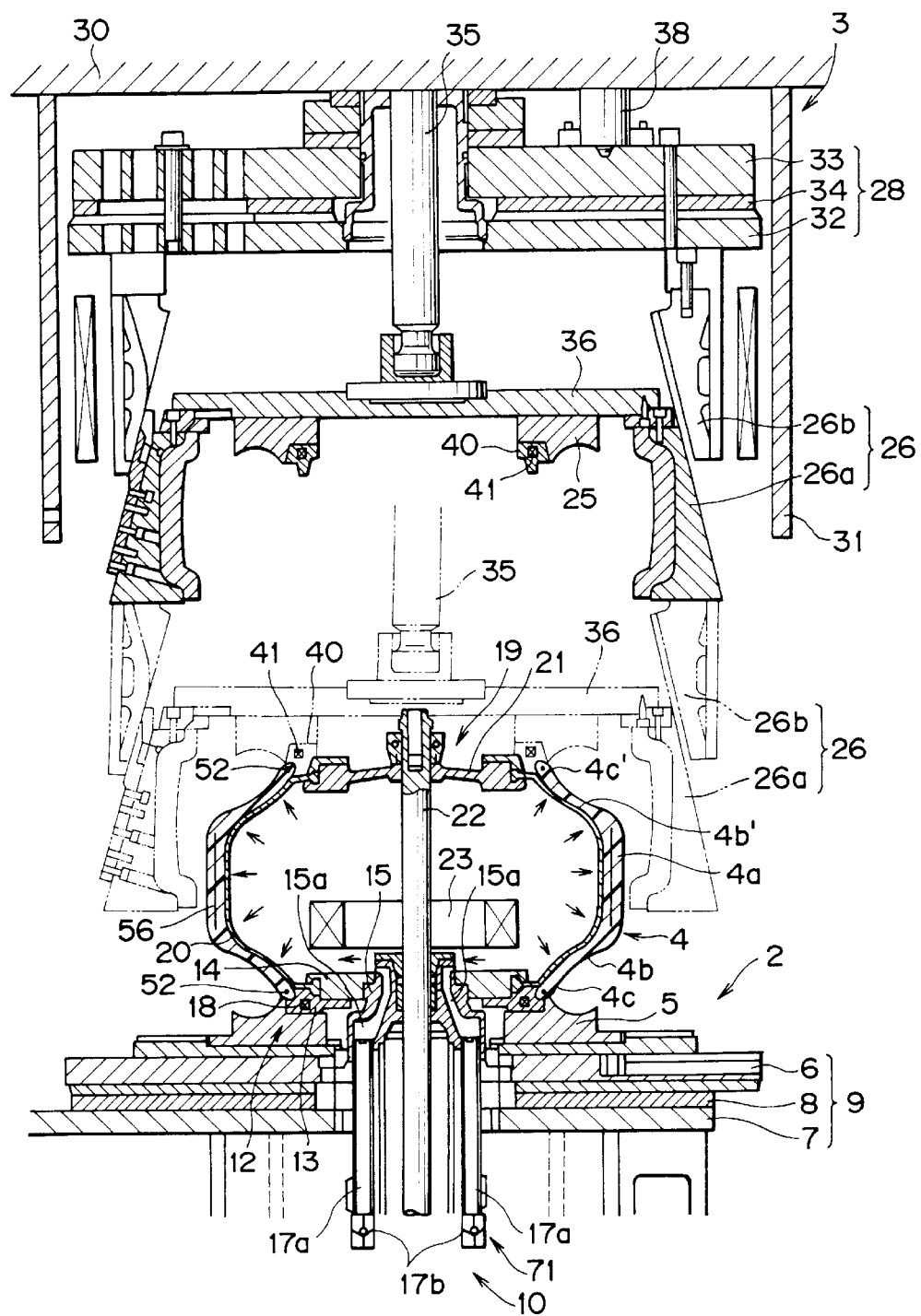
FIG. 6 is an illustrating view showing the state of clamping the mold.

The lower heating mechanism 9 comprises a disc-like lower platen 6 for supporting the lower side mold 5 in planer form as shown in FIG. 6. The lower platen 6 has an internal space to which high-temperature vapor is supplied, and it is heated by the vapor supplied to this internal space to heat the lower side mold 5 in planer form. The lower heating mechanism 9 further comprises a platen support 7 for supporting the lower platen 6 and a heat insulating plate 8 interposed between the lower platen 6 and the platen support 7 to prevent the heat transfer from the lower platen 6 to the platen support 7. The central mechanism 10 is provided in the center of the thus-constituted lower heating mechanism 9, and the central mechanism 10 is provided with a retaining mechanism 71 as an essential part.

The retaining mechanism 71 is attachable and detachable relative to the mold fixed part 2 (the lower heating mechanism 9 and the lower side mold 5), and it comprises, as shown in FIG. 5, a bladder 20, a lower bladder ring 14 retaining the lower edge of the bladder 20, an upper ring 19 retaining the upper edge of the bladder 20, and a center post 22 slidably provided through the center of the lower bladder ring 14 and the upper ring 19 and capable of mutually connecting and fixing both the rings 14, 19 in the following connecting relation and positional relation.

The lower ring 12 has a lower bead ring 13 formed so as to make contact with the lower bead 4c of the green tire 4, the lower bladder ring 14 provided on the upper surface of the lower bead ring 13 to nip the lower edge of the bladder 20, and a clamp ring hub 15 provided on the inner side of the lower bladder ring 14 as shown in FIG. 6. Feeding and discharge passages 15a, 15b for passing a heated and pressurized medium such as vapor or nitrogen gas are formed in the clamp ring hub 15. The feeding and discharge passages 16a, 15b are extended from the upper end surface of the clamp ring hub 15 to the lower end surface thereof, and the lower ends of the feeding and discharge passages 15a, 15b are connected to a heated and pressurized medium supplying device not shown through pipings 17a, 17b and opening and closing valves 17b, 17b in such a manner as to be connectable and disconnectable.

An annular first induction heating coil 18 is provided within the lower bead ring 13. The high frequency power source 24 of FIG. 8 for supplying high frequency power is connected to the first induction heating coil 18 in such a manner as to be connectable and disconnectable. The first induction heating coil 18 preferentially induction-heats the bead wire 52 of the lower bead 4c by applying a strong high frequency magnetic field by the supply of high frequency power to the lower bead 4c of the green tire 4.

The center post 22 is airtightly erected in the center of the thus-constituted lower ring 12 in such a manner as to be vertically slidable. The upper ring 19 is provided on the upper end of the center post 22. The upper ring 19 has an upper bladder ring 21, and the upper bladder ring 21 nips the upper edge of the bladder 20. On the other hand, a post elevating mechanism not shown for raising and lowering the center post 22 to an optional height position is connected to the lower end of the center post 22 in such a manner as to be connectable and disconnectable, and the post elevating mechanism constitutes the central mechanism 10 with the retaining mechanism 71. When the vulcanized tire is carried out, the post elevating mechanism lifts up the upper edge of the bladder 20 to raise the center post 22 to the upper limit position so that the bladder 20 is set to a diameter smaller than the tire hole of the green tire 4, and when the green tire 4 is vulcanization-molded, it lowers the center post 22 to extend the bladder 20 to the diameter contactable with the tire inner wall surface of the green tire 4.

The bladder 20 extended and contracted by the center post 22, which presses the tire inner wall surface in the mold direction by the supply of the pressurized medium in the vulcanization molding of the green tire 4, has a low drawable material difficult to deteriorate under high-temperature environment as the component. The low drawable material is formed into substantially the same shape as the tire inner wall surface in the vulcanized tire obtained by vulcanization-molding the green tire 4. In the bladder 20, polyester is adapted as the low drawable material difficult to deteriorate under high-temperature environment, and it is formed of a bladder body 20a consisting of the polyester formed into substantially the same shape as the tire inner wall surface of the vulcanized tire, and a plurality of magnetic members 20b provided at equal intervals on the surface of the bladder body 20a as shown in FIG. 8. The magnetic member 20b consists of a magnetic metallic thin film such as mesh metal or metal evaporated film, and is formed so that the part corresponding to the tread 4a of the green tire 4 has an area larger than the other part.

The low drawable material means a material having a physical value of elongation percentage smaller than a conventional bladder rubber (for example, butyl rubber) under the high-temperature environment of vulcanization temperature, and the elongation percentage under the high temperature environment of 200° C., particularly, is preferably within the range of 5%–15%. With the elongation percentage less than 5%, the force for uniformly pressing the whole green tire 4 is reduced in vulcanization molding, resulting in insufficient molding property, and with above 15%, it is difficult to precisely vulcanization-mold the green tire 4 similarly to the conventional bladder rubber (for example, butyl rubber).

As the low drawable material difficult to deteriorate under high-temperature environment, a knitted product or woven fabric using a fiber such as nylon, aramid, paraphenylene benzobisoxazole (PBO) and the like, in addition to the above-mentioned polyester, mesh metal, high density fiber, carbon-containing fiber, metal-coated fiber, resin-coated fiber, and the like can be adapted, and these material can be used in a mingled form with at least one thereof. Examples of such a mingled form include the form of a laminated structure of laminating a mesh metal on a polyester film or evaporating a metal film on the polyester film, the form of evenly or unevenly interweaving a metal coated fiber with a high-density fiber, and the like. Further, in order to impart airtightness, the form of impregnating or coating a base material such as the above knitted product or woven fabric with at least one of resin and elastomer such as fluorine or silicon is also adapted. These forms are properly selected according to the design specification of the bladder (the presence or strength of the heating by induction heating).

A second induction heating coil 23 is arranged within the bladder 20. The second induction heating coil 23 is provided around the center post 22, and it is set to a coil height smaller than the closest distance of the upper bladder ring 21 and the lower bladder ring 14 and to a coil diameter smaller than the outer diameter of both the rings 21, 14 so as not to make contact with the contracted bladder 20. The second induction heating coil 23 is arranged so as not to make contact with both the rings 21, 14 even if the upper bladder ring 21 is moved down to the lower limit position. The high frequency power source 24 is connected to the second induction heating coil 23 in such a manner as to be connectable and disconnectable, and the second induction heating coil 23 preferentially induction-heats the magnetic members 20b of the bladder 20 by applying a strong high frequency magnetic field by the supply of high frequency power to the bladder 20.

The thus-constituted retaining mechanism 71 is carried, as shown in FIG. 1, among the vulcanization step, storage step and molding step by a carrying device 43 of FIG. 5. It functions as a molding drum in the molding step, functions to prevent the deformation of the green tire 4 and the slippage of supporting center in the storage step or during the carrying between the steps, and functions as the essential part of the above central mechanism 10 in the vulcanization step.

Figure 2:
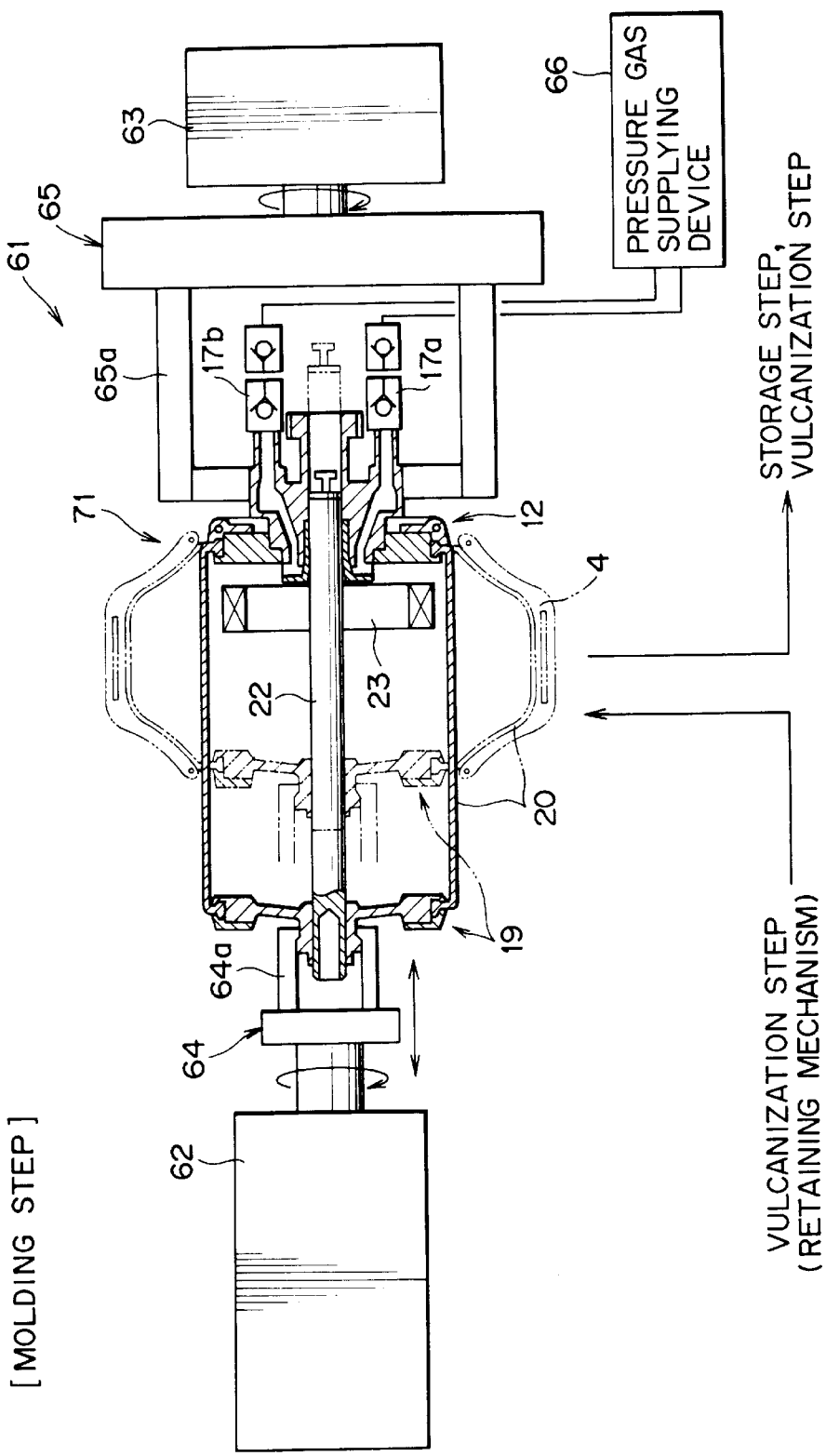
FIG. 2 is an illustrating view showing the state of molding a green tire.

The molding step includes a single-stage type tire molding machine 61. The tire molding machine 61 may be of two-stage type. The tire molding machine 61 comprises a first drive unit 62 and a second drive unit 63 as shown in FIG. 2. The first drive unit 62 and the second drive unit 63 are provided with a first chuck mechanism 64 and a second chuck mechanism 65, respectively. The chuck mechanisms 64, 65 have chuck members 64a, 65a capable of retaining the centers of the upper ring 19 and lower ring 12 of the retaining mechanism 71, respectively. Both the chuck mechanism 64, 65 are arranged opposite to each other so that the rotating axes are present on the same straight line, and mutually interlocked so as to rotate at the same rotating speed and stop at the same rotating angle. The first chuck mechanism 64 can be protruded and recessed in the rotating axial direction to extend and contract the ring space between the upper ring 19 and lower ring 12 of the retaining mechanism 71 at the time of carrying and molding the green tire 4.

The tire molding machine 61 further comprises a pressure gas supplying device 66. The pressure gas supplying device 66 is connectable and disconnectable to one opening and closing valve 17a to expand the green tire 4 as shown by the two-dot chain line in the drawing by supplying a pressure gas to the bladder 20 at the time of taking out the green tire 4. Thus, the green tire 4 formed in the molding step is carried, as shown in FIG. 1, in the state retained by the retaining mechanism 71, and carried to the storage step or vulcanization step, which is the after step.

Figure 4:
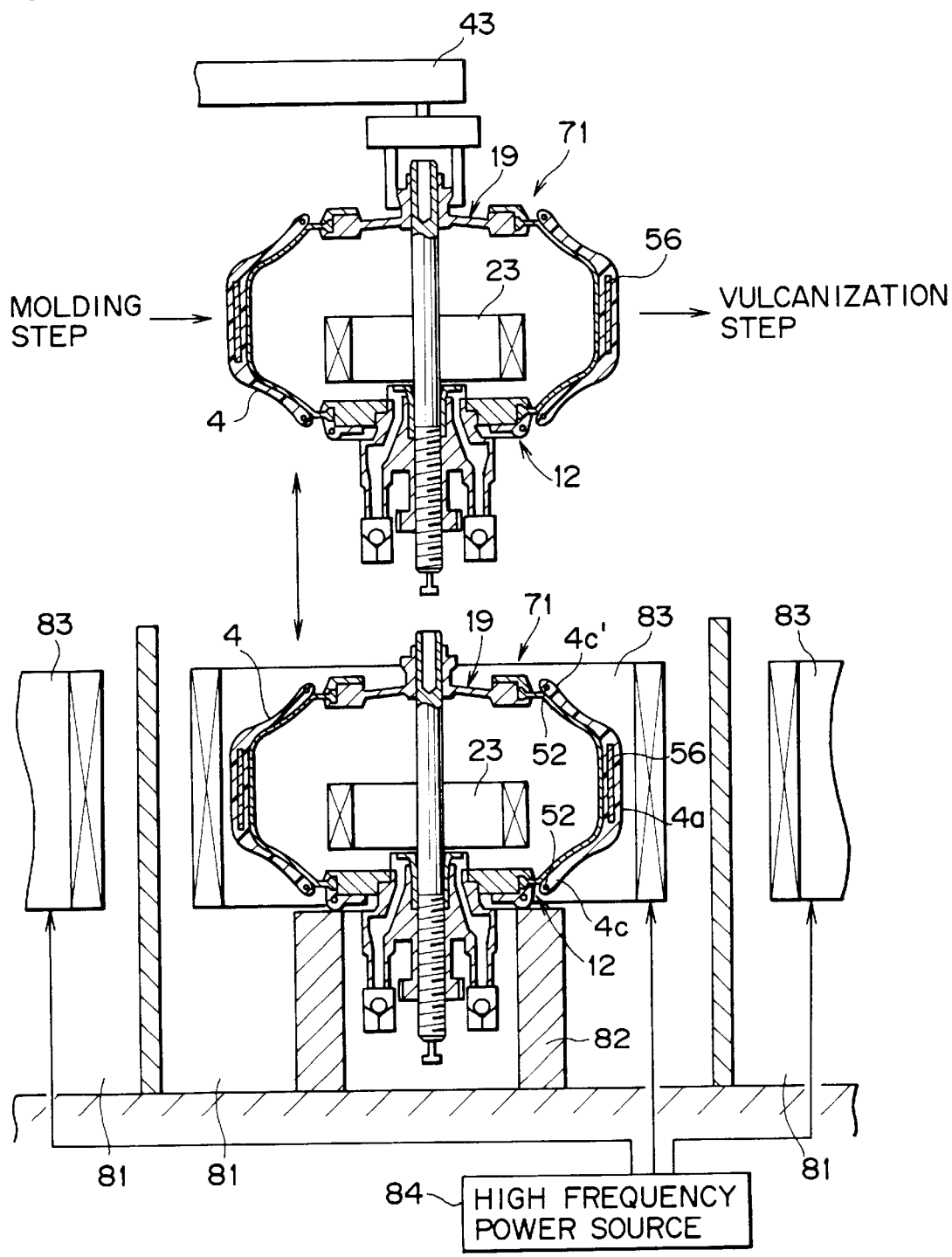
FIG. 4 is an illustrating view showing the state of storing the green tire with preheating in storage step.

The storage step to which the green tire 4 is carried from the molding step includes a storehouse 80 as shown in FIG. 1. The storehouse 80 has a plurality of storage parts 81 for storing the green tire 4 in the state retained by the retaining mechanism 71. Each storage part 81 comprises, as shown in FIG. 4, a cylindrical placing base 82 formed so as to make contact with the lower surface of the lower ring 12, a preheating induction heating coil 83 provided so as to surround the green tire 4 on the placing base 82, and a high frequency power source 84 for supplying a high frequency power to the preheating induction heating coil 83. The preheating induction heating coil 83 preferentially induction-heats the belt member 56 of the tread 4a by applying a strong high frequency magnetic field by the supply of high frequency power from the high frequency power source 84 to the tread 4a of the green tire 4.

The method for manufacturing a tire in the above constitution is further described.

As shown in FIG. 2, the first drive unit 62 of the tire molding machine 61 pulls the first chuck mechanism 64 into the device, whereby the ring space between the upper ring 19 and lower ring 12 of the retaining mechanism 71 is extended to extend the bladder 20 retained by both the rings 19, 12 in a drum shape. The pressure gas supplying device 66 is connected to the one opening and closing valve 17a to supply the pressure gas from the device 66 into the bladder 20, whereby the drum shape is maintained by the internal pressure.

After the pressure gas supplying device 66 is then separated from the opening and closing valve 17a, materials for the inner liner 53 and the carcass assembly 51 are supplied to the surface of the bladder 20 while both the chuck mechanisms 64, 65 are rotated at an equal speed to rotate the drum-like bladder 20 or stop the rotation, and the molding, sticking or embedding of each material is performed. Thereafter, the pressure gas supplying device 66 is connected to the one opening and closing valve 17a, and the first chuck mechanism 64 is protruded while further supplying the pressure gas from the device 66 to the bladder 20, whereby both surfaces of the bladder 20 are extended in a protruding curved form as shown by the two-dot chain line in the drawing. The shaping is performed while maintaining the shape of the bladder 20 by the large internal pressure, whereby the green tire 4 consisting of a plurality of layers including the belt member 56 and the bead wire 52 is formed as shown in FIG. 3.

The upper ring 19 and lower ring 12 of the retaining mechanism 71 are connected and fixed through the center post 22, and the first chuck mechanism 64 is separated from the upper ring 19. After the center part of the upper ring 19 is grasped by the carrying device 48 of FIG. 5, the chuck mechanism 65 is separated from the lower ring 12, and the retaining mechanism 71 is pulled out, whereby the green tire 4 is taken out from the tire molding machine 61 together with the retaining mechanism 71. When a waiting time is present up to the vulcanization molding of the green tire 4, the green tire 4 is carried to the storage step as it is expanded and retained by the retaining mechanism 71 as shown in FIG. 1, and stored with preheating according to the following operation.

The retaining mechanism 71 retaining the green tire 4 is positioned above the placing base 82 as shown in FIG. 4. The retaining mechanism 71 is lowered and placed on the placing base 82, whereby the green tire 4 is stored together with the retaining mechanism 71. Thereafter, the high frequency power from the high frequency power source 84 is supplied to the preheating induction heating coil 83, whereby a strong high frequency magnetic field is applied to the tread 4a of the green tire 4 to induction-heat the belt member 56 of the tread 4a. The high frequency magnetic field generated by the preheating induction heating coil 83 induction-heats also the bead wires 52 of the beads 4c, 4c'. Since the thick tread 4a and beads 4c, 4c' of the green tire 4 are thus heated from the tire internal part even if the green tire 4 is stored under room temperature environment, the reduction in temperature of the green tire 4 is never caused, and the green tire 4 can be heated to a temperature close to the vulcanization temperature depending on the degree of the application of high frequency magnetic field.

In the vulcanization molding of the green tire 4, the green tire 4 is carried into the vulcanization step as it is retained by the retaining mechanism 71, and vulcanization-molded according to the following operation. The mold elevating part 3 is raised as shown in FIG. 5 and located above the mold fixed part 2. Thereafter, the green tire 4 is carried between the mold fixed part 2 and the mold elevating part 3 together with the retaining mechanism 71 by the carrying device 43. When the retaining mechanism 71 is located above the center of the mold fixed part 2, the retaining mechanism 71 is lowered and engaged with the mold fixed part 2. After the connection and fixation between the upper ring 19 and the lower ring 12 through the center post 22 is released, the center post 22 of the retaining mechanism 71 is connected to the post elevating mechanism not shown, and the opening valves 17a, 17b and the induction heating coils 18, 23, 41 are connected to a heated and pressurized medium supplying device not shown and the high frequency power source of FIG. 8, respectively, to make the retaining mechanism 71 function as the central mechanism 10.

Figure 7:
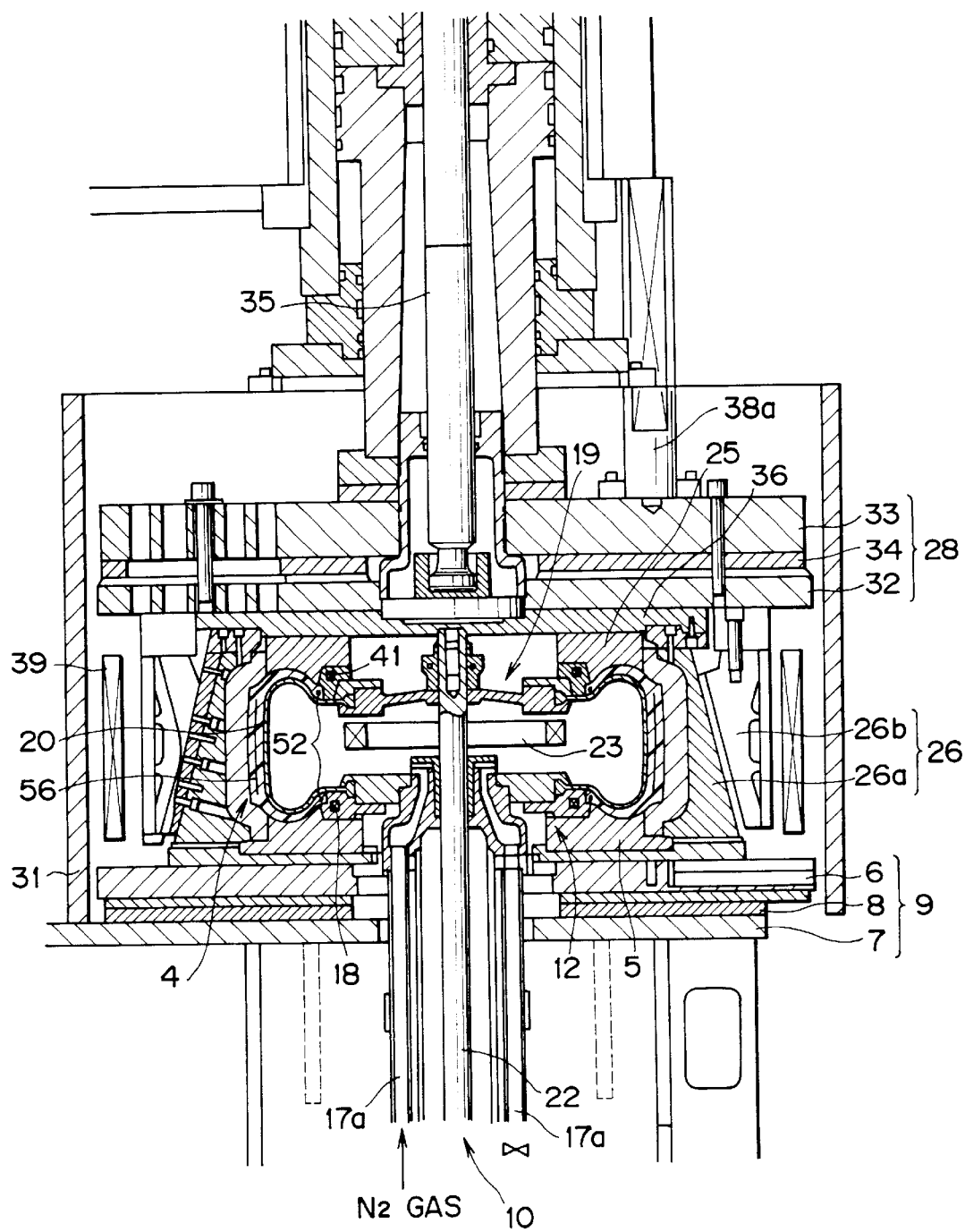
FIG. 7 is an illustrating view showing the mold-clamped state.

The cylinder rod 38a is protruded from the second cylinder member 38 of FIG. 5, and the bar member 35 is protruded from the first cylinder member 37, whereby the upper heating mechanism 28 and the slide plate 36 are lowered and separated to each other as shown in FIG. 6, and the slide segments 26a are circumferentially moved. Thereafter, the mold elevating part 3 is lowered as the separated state between the upper heating mechanism 28 and the slide plate 36 is kept to locate the green tire 4 on the inner side of the slide segments 26a, and the slide segments 26a are moved toward the center by the fixed ring 26b. As shown in FIG. 7, each slide segment 26a is made to abut with each other to form a cylindrical mold corresponding to the tread 4a of the green tire 4, and the upper side mold 25 and the lower side mold 5 are made to abut with the upper and lower parts of this mold, respectively, whereby the clamping of the mold is completed.

The upper platen 32, the lower platen 6, and the split mold 26 are heated to a desired temperature by the supply of high-temperature vapor to heat the upper and lower side molds 25, 5 by both the platens 6, 23 and also make the split mold 26 itself generate heat, whereby the green tire 4 surrounded by the molds 25, 5, 26a' is heated from the outer surface side. A pressure medium such as high-temperature, high-pressure vapor or nitrogen gas is supplied into the bladder 20 through the piping 17a, whereby the green tire 4 is pressed to the inner wall surface of the mold by the bladder 20. The heat of the high-temperature, high-pressure pressure medium is transferred to the green tire 4 through the bladder 20, whereby the green tire 4 is heated from the inner surface side.

Further, the high frequency power from the high frequency power source 24 is supplied to each of the induction heating coils 18, 23, 41, 39 as shown in FIG. 8. The first induction heating coil 18 and third induction heating coil 41 which received the high frequency power preferentially induction-heat the bead wires 52, 52 provided within both the beads 4c, 4c' by applying strong high frequency magnetic fields to the lower bead 4c and upper bead 4c' of the green tire 4. The fourth induction heating coil 39 preferentially induction-heats the belt member 56 provided within the tread 4a by applying the high frequency magnetic field to the tread 4a of the green tire 4 since the split mold 26 is formed of a nonmagnetic material. Accordingly, in addition to the heating from the outer surface side and inner surface side, the green tire 4 is heated also from the tire internal part in the thick beads 4c, 4c' and tread 4c. Therefore, the temperature of the whole tire can be raised to the vulcanization temperature in a short time. Further, when the green tire 4 is preheated in the storage step, the temperature of the green tire 4 can be raised to the vulcanization temperature in a shorter time.

The second induction heating coil 23 which received the high frequency power applies a strong high frequency magnetic field to the magnetic member 20b of the bladder 20 to make the bladder 20 itself generate heat. Since the delay of the transfer time of heat by the bladder 20 can be thus minimized when the heat of the pressure medium is transferred to the green tire 4 through the bladder 20, the green tire 4 is heated to the vulcanization temperature in a further shorter time. The vulcanization molding of the green tire 4 is performed while keeping the green tire at the vulcanization temperature.

During the vulcanization molding of the green tire 4, the bladder 20 presses the green tire 4 in the mold direction so as to mold the green tire 4. At this time, since the bladder 20 is formed of the low drawable material having substantially the same shape as the tire inner wall surface of the vulcanized tire, the shape of the tire inner wall surface of the vulcanized tire can be surely made emergent even if the pressure of the pressure medium is slightly fluctuated. Thus, when the molding of the green tire 4 is performed with pressing by the bladder 20, a precisely molded vulcanized tire can be obtained.

When the vulcanized tire is thus obtained, the mold is opened according to the operation reverse to the above-described operation as shown in FIG. 6, and the center post 22 is raised to contract the bladder 20. The vulcanized tire 4' is pulled out of the retaining mechanism 71 as shown in FIG. 2, the retaining mechanism 71 is taken to the outside, and the vulcanized tire 4' is carried to the after step, while the retaining mechanism 71 is carried to the molding step. Thereafter, a new green tire 4 is carried in to repeat the vulcanization molding according to the above operation. Even if such a vulcanization molding is repeated, the low drawable material of the bladder 20 can maintain the initial property because it is difficult to deteriorate under high-temperature environment. Therefore, the bladder 20 can make the shape of the tire inner wall surface of the vulcanized tire surely emergent even in the stage where the vulcanization molding is highly frequently repeated, and used over a long period.

As described above, in the method of this embodiment, when the green tire 4 is molded on the bladder 20 in the molding step and then carried into the mold of the vulcanizer 1 in the vulcanization step to vulcanization-mold it, the upper bead 4c' and lower bead 4c of the green tire 4 are connected and fixed through the center post 22 as they are retained by the bladder 20 kept in the airtight state by the upper ring 19 and the lower ring 12 until the molded green tire 4 has been carried into the mold of the vulcanizer 1 in the vulcanization step, and a pressure gas is sealed into the bladder 20 located in the internal space of the green tire 4 to extend the bladder 20, thereby expanding the green tire 4.

This embodiment is illustrated with respect to the bladder method of manufacturing the tire by use of the bladder 20, but it is applicable also to the bladderless method of manufacturing the tire without using the bladder 20. Namely, it may comprise connecting and fixing the upper bead 4c' and lower bead 4c of the green tire 4 through the center post 22 while keeping them in the airtight state by the upper ring 19 and the lower ring 12 until the green tire 4 molded in the molding step has been carried into the mold of the vulcanizer 1, and sealing the pressure gas to the internal space of the green tire 4 to directly expand the green tire 4.

According to the above structure, since the green tire 4 is carried between the steps and carried into the mold in the state maintaining a fixed shape, the deformation in carrying of the green tire 4 can be prevented. Thus, when the green tire 4 is set in the vulcanizer, the slippage of supporting center of the green tire 4 can be sufficiently reduced.

Although both the rings 19, 12 (both the beads 4c' 4c) are connected and fixed through the center post 22 in this embodiment, a connecting and fixing joint mechanism can be provided between the upper ring 19 and the lower ring 12 without being limited to the above.

In the vulcanization molding of FIG. 7, the upper ring 19 and the lower ring 12 are desirably connected and fixed through the center post 22 or other joint mechanisms. In this case, since the connection and fixation between the upper bead 4c' and the lower bead 4c can be maintained when the high-temperature, high-pressure pressure gas is supplied to the internal space of the green tire 4 to press the tire inner wall surface in the mold direction, the opening of the mold can be surely prevented even if the clamping force to the mold is small. Thus, since the frame structure of the vulcanizer 1 for imparting the clamping force to the mold can be set to a specification corresponding to a small clamping force, the vulcanizer 1 can be consequently miniaturized to reduce the cost.

We claim:

1. A method for manufacturing a tire comprising the steps of:
    molding a green tire in molding step;
    connecting and fixing the upper bead and lower bead of the green tire while keeping them in the airtight state and sealing a pressure gas to the internal space of the green tire to lay it in the expanded state until the molded green tire has been carried into the mold of a vulcanizer; and
    heating the green tire using an induction heating coil mounted in the internal space of the green tire.

2. A method for manufacturing a tire according to claim 1, wherein the vulcanization molding in the vulcanizer is performed while maintaining the connection and fixation between the upper bead and lower bead of the green tire.

3. A method for manufacturing a tire comprising the steps of:
    molding a green tire on a bladder in molding step;
    connecting and fixing the upper bead and lower bead of the green tire while keeping them in the airtight state and sealing a pressure gas into the bladder located in the internal space of the green tire to lay it in the expanded state until the molded green tire has been carried into the mold of a vulcanizer; and
    heating the green tire using an induction heating coil mounted in the internal space of the green tire.

4. A method for manufacturing a tire according to claim 3, wherein the bladder has a low drawable material difficult to deteriorate under high-temperature environment as a component, and it is formed into the shape of the tire inner wall surface in the vulcanized tire obtained by vulcanization molding the green tire.

5. A method for manufacturing a tire according to claim 3, wherein the vulcanization molding in the vulcanizer is performed while maintaining the connection and fixation between the upper bead and lower bead of the green tire.

6. A method for manufacturing a tire comprising the steps of:
    arranging a retaining mechanism in a tire molding machine in a molding step;
    molding a green tire around the retaining mechanism;
    connecting and fixing the upper bead and lower bead of the green tire while keeping them in the airtight state;
    sealing a pressure gas to the internal space of the green tire to expand it prior to the taking-out of the green tire from the molding step;
    heating the green tire using an induction heating coil mounted on the retaining mechanism and in an internal space of the green tire;
    carrying the green tire to a vulcanization step in this state; and
    vulcanization-molding the green tire within the mold of a vulcanizer in the vulcanization step.

7. A method for manufacturing a tire according to claim 6, wherein the vulcanization molding in the vulcanizer is performed while maintaining the connection and fixation between the upper bead and lower bead of the green tire.

8. A method for manufacturing a tire comprising the steps of:
    arranging a retaining mechanism and a bladder in a tire molding machine in a molding step;
    molding a green tire on the bladder;
    keeping the bladder in the airtight state;
    sealing a pressure gas into the bladder located in the internal space of the green tire to expand it prior to the taking-out of the green tire from the molding step;
    heating the green tire using an induction heating coil mounted on the retaining mechanism and in an internal space of the green tire;
    carrying the green tire into a vulcanization step in this state; and
    vulcanization-molding the green tire within the mold of a vulcanizer in the vulcanization step.

9. A method for manufacturing a tire according to claim 8, wherein the bladder has a low drawable material difficult to deteriorate under high-temperature environment as a component, and it is formed in the shape of the tire inner wall surface in the vulcanized tire obtained by vulcanization-molding the green tire.

10. A method for manufacturing a tire according to claim 8, wherein the bladder has a plurality of magnetic members on the surface and wherein said magnetic members are heated by said induction heating coil during said heating step.

11. A method for manufacturing a tire according to claim 8, wherein the vulcanization molding in the vulcanizer is performed while maintaining the connection and fixation between the upper bead and lower bead of the green tire.

12. A method for manufacturing a tire according to claim 8, wherein the retaining mechanism is provided with an upper bladder ring and a lower bladder ring to seal the pressure gas to the bladder after the upper edge and lower edge of the bladder are retained by both the rings.

13. A method for manufacturing a tire according to claim 8, wherein the green tire is carried into storage step prior to the carrying into the vulcanization step, preheated during the storage, and then carried into the vulcanization step.

14. A method for manufacturing a tire according to claim 3, wherein the bladder has a plurality of magnetic members on the surface and wherein said magnetic members are heated by said induction heating coil during said heating step.

* * * * *